(12) United States Patent
Pajevic et al.

(10) Patent No.: US 10,902,880 B2
(45) Date of Patent: Jan. 26, 2021

(54) MOVEABLE MOTOR AND COVER FOR MOBILE DRIVE UNIT TURNTABLE

(71) Applicant: Amazon Technologies, Inc., Seattle, WA (US)

(72) Inventors: Dragan Pajevic, Arlington, MA (US); Gabriel Hebert, Waltham, MA (US)

(73) Assignee: Amazon Technologies, Inc., Seattle, WA (US)

( * ) Notice: Subject to any disclaimer, the term of this patent is extended or adjusted under 35 U.S.C. 154(b) by 356 days.

(21) Appl. No.: 15/934,845

(22) Filed: Mar. 23, 2018

(65) Prior Publication Data
US 2019/0295591 A1 Sep. 26, 2019

(51) Int. Cl.
| | |
|---|---|
| *B25J 5/00* | (2006.01) |
| *G11B 19/20* | (2006.01) |
| *G11B 19/265* | (2006.01) |
| *B66F 9/06* | (2006.01) |

(52) U.S. Cl.
CPC ........... *G11B 19/2009* (2013.01); *B25J 5/007* (2013.01); *B66F 9/063* (2013.01); *G11B 19/265* (2013.01)

(58) Field of Classification Search
CPC ... G11B 19/2009; G11B 19/265; B66F 9/063; B25J 5/007; B25J 13/006; B25J 9/0009; B25J 9/0093; B65G 1/1378; B65G 1/0492; B65G 1/137; B65G 41/008; B65G 15/00; B65G 41/005; B65G 15/28; B65G 37/00; G06Q 10/087; G05D 1/0287; G05D 2201/0216; G05B 2219/39146; Y10S 901/01
See application file for complete search history.

(56) References Cited

U.S. PATENT DOCUMENTS

| | | | |
|---|---|---|---|
| 2016/0167888 A1 | 6/2016 | Messina | |
| 2016/0236867 A1* | 8/2016 | Brazeau | B65G 1/1378 |
| 2016/0334799 A1* | 11/2016 | D'Andrea | B66F 9/063 |

FOREIGN PATENT DOCUMENTS

| | | |
|---|---|---|
| DE | 202013004209 U1 | 7/2013 |
| WO | WO 2016/162746 A1 | 10/2016 |

OTHER PUBLICATIONS

International Patent Application No. PCT/US2019/023757; Int'l Search Report and the Written Opinion; dated Jun. 27, 2019; 14 pages.
International Patent Application No. PCT/US2019/023757; Int'l Preliminary Report on Patentability; dated Oct. 8, 2020; 8 pages.

* cited by examiner

*Primary Examiner* — Ian Jen
(74) *Attorney, Agent, or Firm* — BakerHostetler

(57) ABSTRACT

A mobile drive unit includes a turntable and a turntable motor that is located outside of the footprint of the turntable. The motor moves up and down with the turntable such that a motor cover moves up and down with the turntable.

20 Claims, 2 Drawing Sheets

MOVEABLE MOTOR AND COVER FOR MOBILE DRIVE UNIT TURNTABLE

BACKGROUND

The present invention is related to robotic devices, and more particularly to a mobile drive unit having a turntable.

Modern warehouses move products on a vast scale. In some cases, such as in certain types of order fulfillment centers, products are housed in pods, which are four sided shelving units on metal frame and legs. The pods are moved about fulfillment centers by mobile drive units.

Mobile drive units are robotic devices that may, for example, have center drive wheels, front and rear casters, an upwardly facing camera, a downwardly facing camera enclosed, and a lift unit for lifting and lowering the pod before and after movement, all of which are enclosed within a housing. The top of the housing includes a circular opening that a lift, such as a turntable extends through. The turntable engages the underside, as the turntable is connected to the lift unit. The turntable also is connected to a turntable motor such that when the pod is on the turntable, the turntable turns the pod to orient the face of the pod as desired.

Some mobile drive units have a ring gear coupled to the turntable. The ring gear has inboard teeth, a pinion inboard of gear, and a turntable motor for driving the pinion. The layout of these mobile drive units is designed such that all the turntable drive components, including the pinion and turntable motor, are beneath the periphery of the turntable—that is, the turntable pinion and turntable motor lie within the footprint (a cylindrical projection defined by the periphery) of the turntable.

DETAILED DESCRIPTION OF ILLUSTRATIVE EMBODIMENTS

Figure 1:
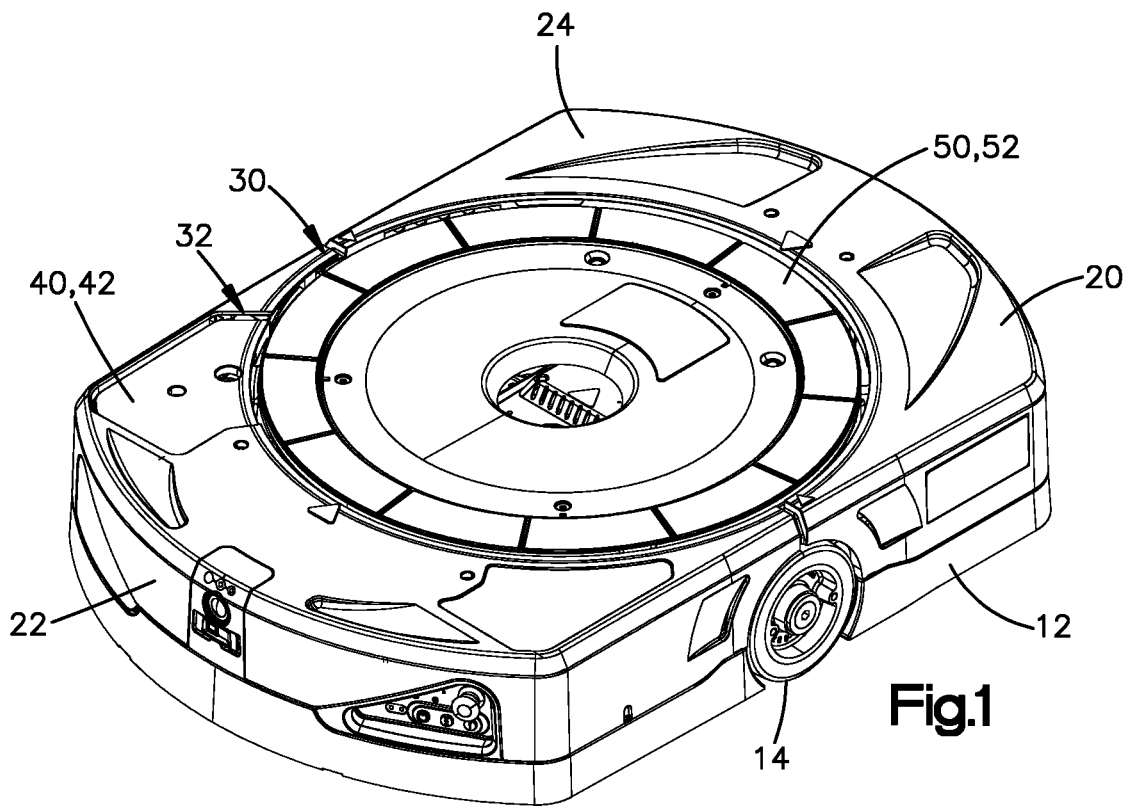
FIG. 1 is a perspective view of a mobile drive unit illustrating a turntable and motor cover in the down or retracted position.

In some mobile drive unit configurations, the turntable, pinion, and turntable motor share common supports such that the turntable, motor, and pinion move upwardly and downwardly together by the action of the turntable lift motor within the footprint of the turntable. This configuration (that is, the turntable drive components being located within the turntable footprint and moveable up and down with the turntable) enables the drive components to remain engaged as the turntable is raised and lowered. There are advantages to this configuration, in that moving parts are safely packed under the turntable away so that only the turntable itself protrudes from the main housing to engage a pod. But the inventors of the present invention appreciated a layout wherein the turntable drive components being located within the turntable footprint has certain inherent design limitations.

Specifically, in order for the turntable drive components to be located within the turntable footprint, the area below the turntable motor must include an otherwise vacant space for the components in the down or retracted position, with the region inside of the turntable bearing, which typically is near the turntable's periphery, being the most convenient. Thus, regardless of the choice and configuration of prior art drive components (for example, a brushless DC motor having a pinion coupled to its output shaft, which pinion drives a ring gear that is either inboard or outboard of the pinion), the turntable drive components of these mobile drive units known to the inventors have been located within the footprint of the turntable.

Referring to the figures to illustrate an example of a present embodiment, a mobile drive unit 10 is of the type that is configured to move pods or like structures, which mobile drive units are well known among persons familiar with order fulfillment or modern warehouse automation. Accordingly, the description herein is not intended to be an all-encompassing explanation of a mobile drive unit, as persons familiar with the technology related to the field will understand the systems for moving and controlling the mobile drive unit.

The mobile drive unit includes a cover and a horizontally oriented turntable mounted in the mobile drive unit. The turntable rotates relative to the mobile drive unit cover and extends through the mobile drive unit cover. A motor for rotating the turntable is located outside the footprint of the turntable. A motor cover houses the motor. The motor cover is located in a cut-out in the mobile drive unit cover, and the cover moves up and down relative to the cover.

The turntable, the motor, and the motor cover are raised and lowered together relative to the mobile drive unit cover. By mounting the motor and motor cover to the side of the turntable, rather than underneath the turntable, space 99 underneath the turntable may be used to house other drive components, which aids in efficient packing of components within the drive unit, as the cameras and other electronics preferably are centrally located. A clearance G between the underside of the motor 80 and chassis 12 reflects the minimum dimension while the turntable is in the retracted position.

Mobile drive unit 10 includes a chassis 12, a pair of wheels 14 on opposing sides of the unit 10, and a cover 20. Chassis 12 may be of any configuration that interfaces with cover 20. Cover 20 includes sidewalls 22 that wrap around the perimeter of the unit 10 and a top plate 24 that merges smoothly from sidewalls 22. A first cutout 30 is located at roughly the center of cover 20 and has a circular shape.

Cover 20 also has a second cutout 32 in top plate 24 that opens onto or merges with the first cutout 30. In this regard, cutout 32 is referred to as being continuous with the first cutout 30.

A motor cover or cover 40 is located in cutout 32. Cover 40 in top view has a perimeter that matches the shape of cutout 32, and includes a top plate 42 from which approximately vertical sidewalls 44 extend downwardly. Preferably, cover 20 and motor cover 40 are formed of an impact resistant plastic.

A turntable 50 is located within the perimeter of the first cutout 30. Preferably, in the down or retracted position (FIG. 1), a top or contact surface 52 of turntable 50 is approximately flush with cover top plate 24 and motor cover top plate 42 such that the upper portion of mobile drive unit 10 has no protrusion that extend upwardly.

Figure 2:
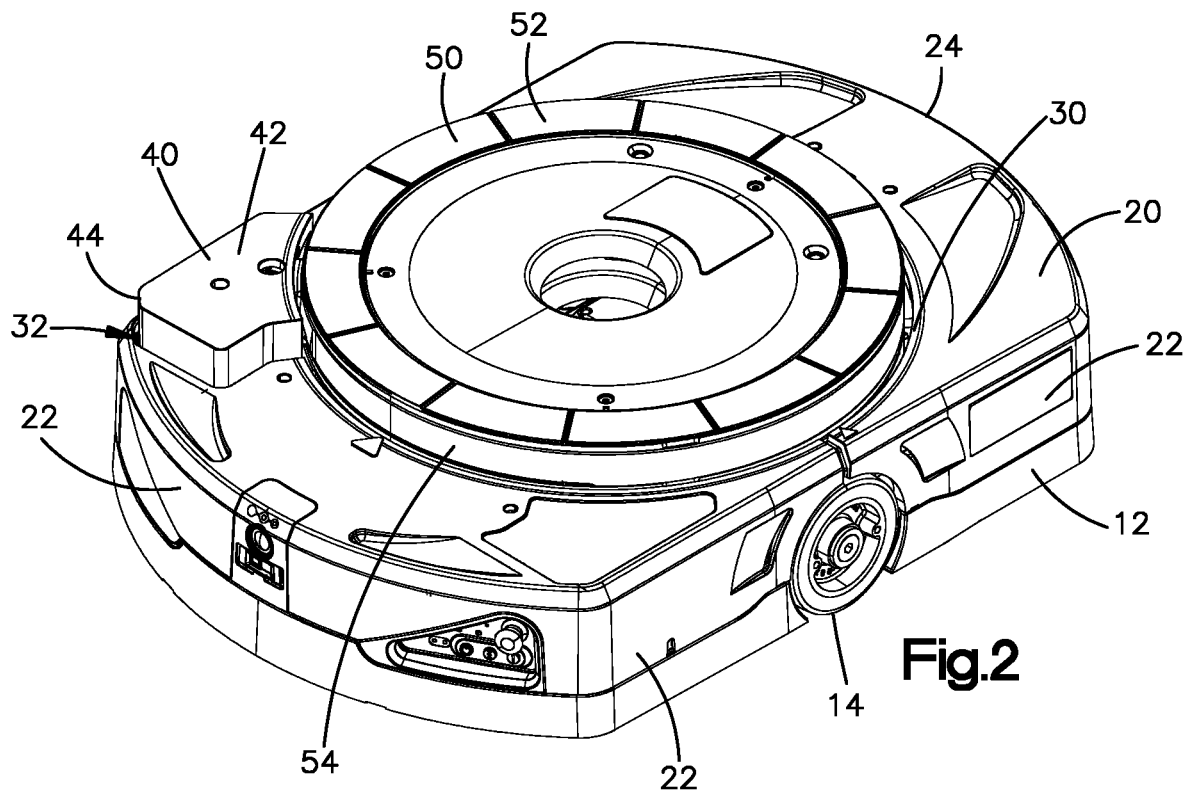
FIG. 2 is a perspective view of the mobile drive unit of FIG. 1 illustrating the turntable and motor cover in an up or extended position.
Figure 3:
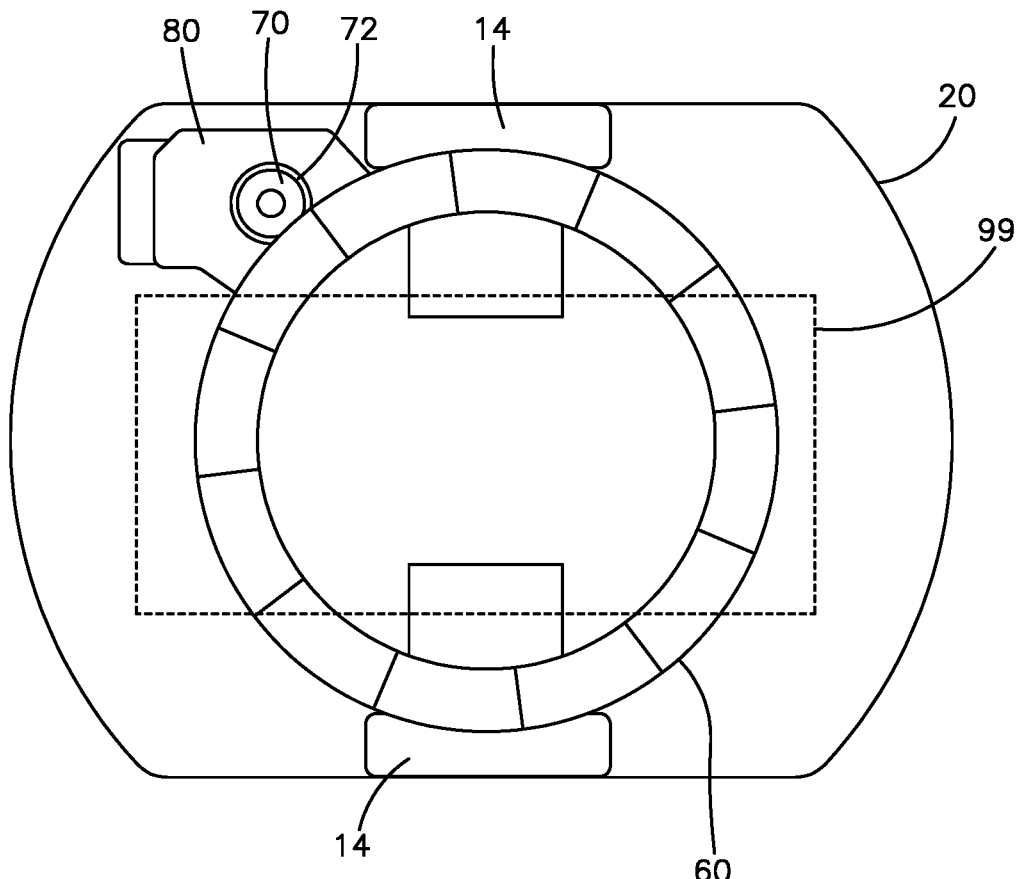
FIG. 3 is a top view of the mobile drive unit of FIG. 1 with portions removed to illustrate aspects of the turntable and motor assembly.

Turntable 50 is vertically moveable upwardly relative to the retracted position to an up or extended position. As best illustrated in FIG. 2, turntable has a side surface extending downwardly from the contact surface 52 and extending around its periphery. In the extended position, turntable 50 is in position to engage an underside of a pod (not shown in the figures) or other structure for supporting or carrying items. Mobile drive unit 10 includes a lift mechanism for moving turntable 50 between the retraced and extend positions. The lift mechanism can be of any type, as understood by persons familiar with mobile drive unit technology.

Mobile drive unit 10 includes features that enable turntable 50 to rotate about a vertical axis to rotate a pod when the turntable 50 engages and lifts the pod. In this regard, unit 10 includes a motor 80, which in the embodiment of the figures is vertically mounted such that the output shaft of the motor extends vertically upwardly. For example, motor 80 may be a brushless, DC motor that is powered by batteries on board in the mobile drive unit 10.

Figure 4:
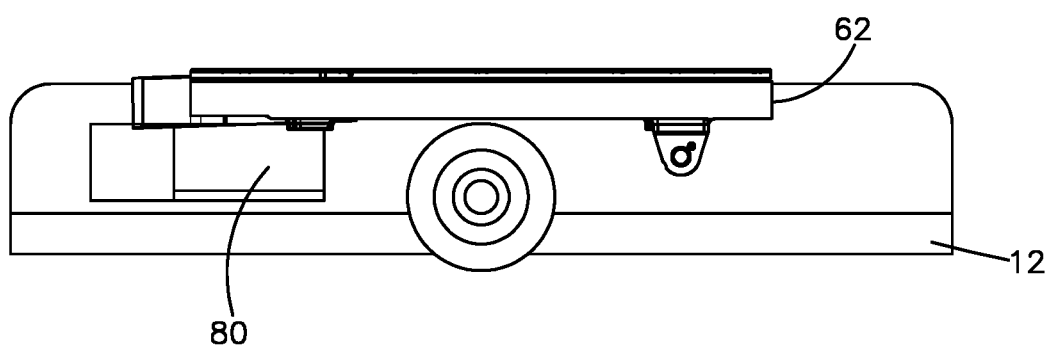
FIG. 4 is a side view of the mobile drive unit of FIG. 3.

A circular or ring gear 60 is attached to underside of turntable 50. Gear 60 includes teeth 62 (shown schematically in FIG. 4) on the outboard side. A pinion 70 is mounted on the output shaft of motor 80 and include pinion teeth 72 that are engaged with teeth 62 of ring gear 60. Thus, pinion 70 and the output shaft of motor 80 are on the outboard side of gear 60, which is located generally outside of the turntable bearing. Thus, motor 80 is outside the footprint of turntable 50 (that is, a vertical cylindrical projection defined by periphery of the turntable). The gear teeth may be a spur gear configuration or any other tooth type.

In operation, a mobile drive unit may be moved according to a control system to an operating position underneath a pod while the turntable of the mobile drive unit is in the down or retracted position. Upon confirmation of proper positioning, such as by an upwardly facing camera (not shown), a lift motor raises turntable 50, gear 60, pinion 70, and motor 80 together to engage the turntable contact surface 52 with the underside of the pod.

In the extended position, the sidewalls 54 of turntable 50 extend above the cover top plate 24 and thus forms an enclosure that prevent a gap between turntable contact surface 52 and the circular rim that forms cutout 30. Also in the extended position, sidewalls 44 of motor cover 40 extend above cover top plate 24 and thus forms an enclosure that prevents a gap between the motor cover top plate 42 and the rim forming cutout 32.

With the turntable in the extended position and the weight of the pod on turntable 50, the control system energizes motor 80 to turn pinion 70 to drive gear 60 and turntable 50 to the desired position. Motor 80 may have an encoder such that motor position or the magnitude of motor rotation is known.

The present invention is described by employing a specific structure and function. The present invention is not limited to the particular structure and function disclosed, as persons familiar with mobile drive unit technology in view of the specification will understand that modifications to the disclosed structure and variations thereof may be employed within the scope of the claims. Accordingly, the inventors intend that the claims define the scope of the invention.

What is claimed is:

1. A mobile drive unit comprising:
    a mobile drive unit cover having a first cutout portion and a second cutout portion;
    a horizontally oriented turntable mounted in the mobile drive unit, the turntable being adapted for rotation relative to the mobile drive unit cover and adapted for vertical movement through the first cutout portion of the mobile drive unit cover;
    a motor for rotating the turntable;
    a motor cover that houses the motor, the motor cover being adapted to move vertically with the horizontally oriented turntable through the second cutout portion in the mobile drive unit cover.

2. The mobile drive unit of claim 1 wherein the motor is located outside a footprint of the turntable.

3. The mobile drive unit of claim 2 wherein the first cutout includes a circular top opening through which the turntable extends.

4. The mobile drive unit of claim 3 wherein the second cutout is continuous with the circular cover top opening.

5. The mobile drive unit of claim 4 wherein the turntable has an extended position in which the turntable and the motor cover protrude above the mobile drive unit cover.

6. The mobile drive unit of claim 1 wherein the motor cover includes an upper panel and side panels that extend downwardly from the upper panel, thereby enclosing the motor while the turntable is in the extended position.

7. The mobile drive unit of claim 4 further comprising a gear and pinion adapted for rotating the gear.

8. The mobile drive unit of claim 7 wherein the gear is a ring gear having outboard teeth and the pinion is outboard of the ring gear.

9. The mobile drive unit of claim 8 wherein the pinion is mounted to an output shaft of the motor.

10. The mobile drive unit of claim 8 wherein the turntable, motor, and motor cover are structurally connected.

11. A turntable and cover assembly for a mobile drive unit, the assembly comprising:
    a mobile drive unit cover;
    a horizontally oriented turntable mounted in the mobile drive unit, the turntable being adapted for rotation relative to the mobile drive unit cover and adapted for extending through the mobile drive unit cover;
    a motor for rotating the turntable;
    a motor cover that houses the motor, the motor cover being located in a cut-out in the mobile drive unit cover and adapted to for extending through the mobile drive unit cover;
    wherein turntable, the motor, and the motor cover are adapted to be raised and lowered together relative to the mobile drive unit cover.

12. The assembly of claim 11 wherein the motor is located outside a footprint of the turntable.

13. The assembly of claim 12 wherein the mobile drive unit cover includes a circular top opening through which the turntable extends.

14. The assembly of claim 13 wherein the cut: out is continuous with the circular top opening.

15. The assembly of claim 14 wherein the turntable has an extended position in which the turntable and the motor cover protrude above the mobile drive unit cover.

16. The assembly of claim 11 wherein the motor cover includes an upper panel and side panels that extend downwardly from the upper panel, thereby enclosing the motor while the turntable is in the extended position.

17. The assembly of claim 11 wherein the turntable, motor, and motor cover are structurally connected.

18. A method of operating a mobile drive unit, the mobile drive unit comprising a turntable, a motor configured to actuate the turntable, and a motor cover configured to house the motor, the method comprising the steps of:
    (a) positioning a mobile drive unit underneath a pod while the turntable of the mobile drive unit is in a down position;

(b) raising the turntable, the motor, and the motor cover such that the turntable engages an underside of the pod; and (c) rotating the turntable while the pod is engaged with the turntable to rotate the pod.

19. The method of claim 18 wherein the raising step (b) includes raising a ring gear and a pinion outboard of the ring gear with the motor and motor cover.

20. The method of claim 19 wherein the mobile drive unit includes a unit cover and the raising step (b) includes extending the turntable above the unit cover of the mobile drive unit.

\* \* \* \* \*